(12) United States Patent
Walters et al.

(10) Patent No.: US 6,833,690 B2
(45) Date of Patent: *Dec. 21, 2004

(54) THERMALLY COMPENSATED CURRENT SENSING OF INTRINSIC POWER CONVERTER ELEMENTS

(75) Inventors: Michael M. Walters, Apex, NC (US);
Matthew B. Harris, Durham, NC (US);
Bogdan M. Duduman, Raleigh, NC (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/806,605

(22) Filed: Mar. 23, 2004

(65) Prior Publication Data

US 2004/0178779 A1 Sep. 16, 2004

Related U.S. Application Data

(63) Continuation of application No. 10/219,555, filed on Aug. 15, 2002
(60) Provisional application No. 60/313,986, filed on Aug. 21, 2001.

(51) Int. Cl.[7] .......................... G05F 1/573; G05F 1/565
(52) U.S. Cl. ....................................... 323/277; 323/275
(58) Field of Search .............................. 323/222, 223, 323/226, 265, 269, 271, 273, 275–277, 282, 285, 290, 907; 363/50, 56.02, 98, 132

(56) References Cited

U.S. PATENT DOCUMENTS

| | | | |
|---|---|---|---|
| 4,334,263 A | 6/1982 | Adachi | 363/25 |
| 5,237,262 A | 8/1993 | Ashley et al. | 323/284 |
| 5,627,460 A * | 5/1997 | Bazinet et al. | 323/288 |
| 5,717,322 A | 2/1998 | Hawkes et al. | 323/283 |
| 5,723,974 A | 3/1998 | Gray | 323/282 |
| 5,793,193 A | 8/1998 | Hodgins | 323/284 |
| 5,805,433 A | 9/1998 | Wood | 363/16 |
| 5,920,241 A | 7/1999 | Mazaochette | 333/174 |
| 5,982,160 A | 11/1999 | Walters et al. | 323/282 |
| 6,246,220 B1 | 6/2001 | Isham et al. | 323/224 |
| 6,469,916 B1 * | 10/2002 | Kerkman et al. | 363/41 |
| 6,734,656 B2 * | 5/2004 | Miller et al. | 323/284 |

FOREIGN PATENT DOCUMENTS

| | | | |
|---|---|---|---|
| EP | 0 483 852 | 5/1992 | H02M/3/335 |
| EP | 0 992 799 | 4/2000 | G01R/19/32 |

OTHER PUBLICATIONS

Patent Abstracts of Japan, published on Nov. 4, 1994 under Publication No. 06309045 entitled "Direct–Current Stabilizing Power Source", Applicant: Nec Tohoku Ltd.; Inventor: Matsuda Hideshi.

* cited by examiner

*Primary Examiner*—Matthew V. Nguyen
(74) *Attorney, Agent, or Firm*—Allen, Dyer, Doppelt, Milbrath & Gilchrist, P.A.

(57) ABSTRACT

A DC-to-DC converter includes one or more power switches, a pulse width modulation circuit for generating control pulses for the power switches, and an output inductor connected to the power switches. A thermally compensated current sensor is connected to an intrinsic current sensing element exhibiting a temperature-based parameter non-linearity. The thermally compensated current sensor has a temperature coefficient that substantially matches a temperature coefficient of an intrinsic power converter element used to measure current flow, thus linearizing the current measurement. Also, a current feedback loop circuit cooperates with the pulse width modulation circuit to control the power switches responsive to the thermally compensated current sensor.

17 Claims, 3 Drawing Sheets

THERMALLY COMPENSATED CURRENT SENSING OF INTRINSIC POWER CONVERTER ELEMENTS

RELATED APPLICATION

This application is a continuation of application Ser. No. 10/219,555, filed Aug. 15, 2002, which is based upon prior filed copending provisional application No. 60/313,986 filed Aug. 21, 2001, the entire disclosure of which is incorporated herein by reference.

FIELD OF THE INVENTION

The present invention relates to the field of electronic circuits, and more particularly, to DC-DC converters and associated methods.

BACKGROUND OF THE INVENTION

Typically, DC-DC converters use current flow information to provide value added functions and features. For example, limiting the current during an overload is commonly implemented as a safety feature. Such a current limit feature would use a signal proportional to output current limiting level. A resistor inserted between the output and the load could generate the desired signal. However, the resistance of this sensor is the subject of a trade-off between power dissipation and signal amplitude. Typically, the signal level at current limit is approximately 0.1 volt, to be well above the noise floor. The sensing resistor's power dissipation is proportional to the load current at the limit level. At high current levels, the power dissipation can be excessive.

Eliminating the sensing resistor improves the DC-DC converter's efficiency. Instead of an additional resistive element, current flow is measured using the intrinsic elements within the power converter components. For example, U.S. Pat. No. 5,982,160 to Walters et al. and entitled "DC-to-DC converter with inductor current sensing and related methods" teaches that the current flow information in an inductor can be reconstructed as a voltage across a resistor-capacitor network. This method uses the intrinsic resistance of the inductor's winding as the current sensing element.

Another method to eliminate the current sensing resistor measures the voltage dropped across the nearly constant, on-state resistance of one of the switching MOSFETs in the converter. The method samples the voltage drop during the conduction interval of the MOSFET to reconstruct the current flow information. Both of these methods make use of the fundamental power converter components as current sensing elements and they avoid using a dissipative element in the power path.

The intrinsic current sensing methods in the above examples can only approximate the actual current flow. These methods suffer in accuracy when compared with the current sensing resistor. For example, utilizing the inductor's winding resistance as the current sensing element suffers both an initial tolerance error and a variation with temperature. An inductor's winding initial resistance varies with the length and diameter of the winding's wire, as well as the specific manufacturing procedure. This same wire resistance increases as a function of temperature. Therefore, the reconstructed voltage signal is a function of the inductor windings' mechanical tolerance and temperature as well as the current flow.

SUMMARY OF THE INVENTION

In view of the foregoing background, it is therefore an object of the invention to provide low power dissipation while accurately measuring and processing current information with thermal compensation in a switching DC-to-DC converter.

This and other objects, features and advantages in accordance with the present invention are provided by a DC-to-DC converter including one or more power switches, a pulse width modulation circuit for generating control pulses for the power switches, and an output inductor connected between the power switches and an output terminal. A thermally compensated current sensor is connected to the output inductor for sensing current in the output inductor. The thermally compensated current sensor has a temperature coefficient that substantially matches a temperature coefficient of the output inductor. Also, a current feedback loop circuit cooperates with the pulse width modulation circuit to control the power switches responsive to the thermally compensated current sensor.

The power switches preferably include a low side field effect transistor and a high side field effect transistor connected together. The thermally compensated current sensor may be connected in parallel with the output inductor and may comprise a resistor and a capacitor connected in series. The resistor of the thermally compensated current sensor may be a positive temperature coefficient resistor.

Alternatively, the thermally compensated current sensor may be connected to the at least one power switch for providing a sensed current proportional to a current being conducted through the output inductor. Here, the thermally compensated current sensor has a temperature coefficient that substantially matches a temperature coefficient of an on-state resistance of the power switches. Also, in this embodiment, the thermally compensated current sensor is connected between the power switches and the current feedback loop circuit, and comprises a positive temperature coefficient resistor.

Another aspect of the present invention relates to a multiphase DC-to-DC converter having multiple channels. Each of the channels includes a power device with, e.g. a low side power switch and a high side power switch connected together. A pulse width modulation circuit generates control pulses for the power device, and an output inductor is connected between the power device and the output terminal. A thermally compensated current sensor is connected to the power device in each channel for providing a sensed current proportional to a current being conducted through the output inductor. The thermally compensated current sensor has a temperature coefficient that substantially matches a temperature coefficient of an on-state resistance of the low side power switch. Also, a current feedback loop circuit cooperates with the pulse width modulation circuit for controlling the power device responsive to the thermally compensated current sensor.

In an alternative embodiment of the multiphase DC-to-DC converter, instead of the thermally compensated current sensor, a feedback resistive network is connected between an input of the control circuit of each of channels and the output terminal. The feedback resistive network includes a negative temperature coefficient resistor having a temperature coefficient that substantially matches a temperature coefficient of an on-state resistance of the monitored power switch of the power devices.

A method aspect of the present invention is directed to regulating a DC-to-DC converter comprising an output terminal, power switches, a pulse width modulation circuit for generating control pulses for the power switches, an output inductor connected between the power switches and the output terminal, and a current feedback loop circuit cooperating with the pulse width modulation circuit for controlling the power switches. The method includes sensing current passing through the inductor using a thermally compensated current sensor connected to the output inductor. Again, the thermally compensated current sensor has a temperature coefficient that substantially matches a temperature coefficient of the output inductor. Furthermore, the current feedback loop circuit operates to control the at least one power switch in response to the thermally compensated current sensor.

Alternatively, the method may include providing a sensed current proportional to a current being conducted through the output inductor using a thermally compensated current sensor connected to at least one power switch. Here, the thermally compensated current sensor has a temperature coefficient that substantially matches a temperature coefficient of an on-state resistance of the at least one power switch. The current feedback loop circuit controls the at least one power switch in response to the thermally compensated current sensor.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Some functions and features of the DC-DC converter do not require high precision current flow information and the intrinsic methods discussed above offer an efficiency advantage. However, other functions and features demand better precision. An example demanding high precision is load line characteristic or droop feature found in DC-DC power conversion for microprocessors. Here, the output voltage is programmed to decrease (droop) with increasing load current. The droop feature positions the output voltage at the optimum level prior to a load transient so the transient voltage excursion stays within acceptable levels with the minimum output capacitance. The precision is required to minimize not only the bulk output capacitance but also the high-frequency distribution capacitance.

Figure 1:
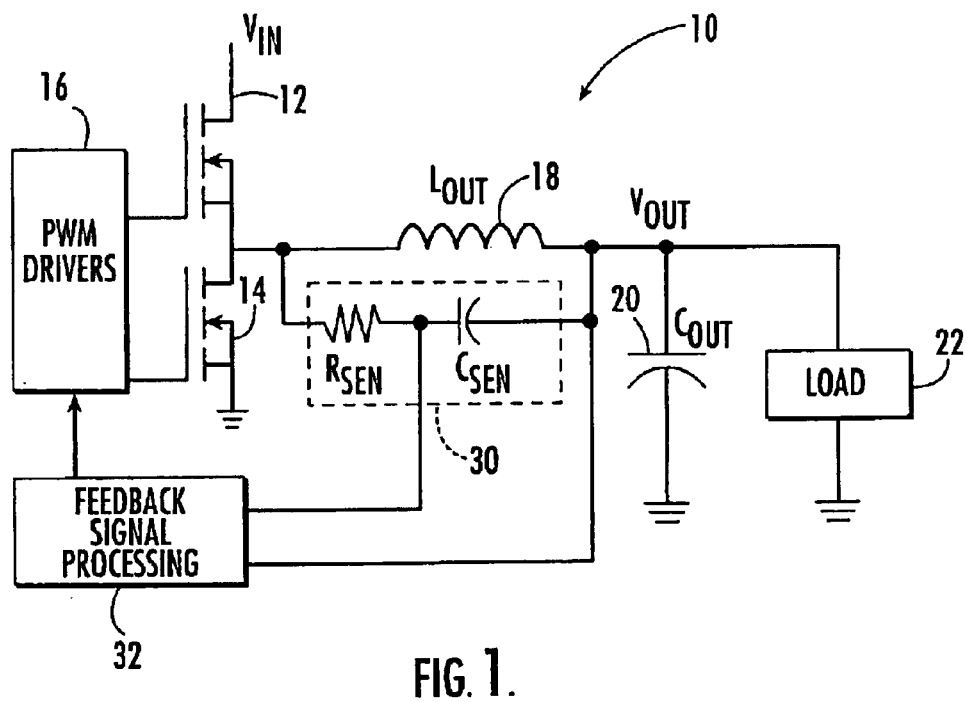
FIG. 1 is a schematic diagram of a DC-to-DC converter of the present invention.

Turning now to FIG. 1 of the drawings, the DC-to-DC converter 10 in accordance with a first embodiment of the present invention is now described. The DC-to-DC converter 10 provides a controlled voltage Vout to a load 22. In the illustrated embodiment, the DC-to-DC converter 10 includes a pair of power switches, a high side switch 12, and a low side switch 14 connected to a source voltage Vin. Of course, as will be readily appreciated by those skilled in the art, the DC-to-DC converter 10 in other embodiments may include only the high side switch 12, with a diode substituted in the position of the low side switch 14. In addition, although MOSFET transistors are illustrated, other semiconductor switches may be used as will also be understood by those skilled in the art.

The DC-to-DC converter 10 also includes the schematically illustrated pulse width modulation circuit 16 which would also preferably include switch drivers. This circuit portion is more fully described, for example, in U.S. Pat. No. 5,717,322 to Hawkes et al. and U.S. Pat. No. 5,793,193 to Hodgins, both assigned to the assignee of the present invention. Both of these patents are also incorporated by reference herein in their entirety. The pulse width modulation circuit 16 generates a series of pulse width modulated control pulses for the power switches 12, 14 to regulate the output voltage Vout coupled to the load 22. Those of skill in the art will readily appreciate the construction and operation of the pulse width modulation circuit 16 without further detailed discussion.

The illustrated DC-to-DC converter 10 also includes an output inductor 18 coupled between the load 22 and a node between the high and low side switches 12, 14. A diode may also be connected between ground and the node between the high and low side power switches 12, 14. An output capacitor 20 is connected in parallel across the load 22 as will also be readily appreciated by those skilled in the art.

This embodiment of the present invention provides a current sensor 30 connected in parallel with the output inductor 18 for sensing current passing through the inductor. The current sensor 30 preferably comprises a resistor Rsen and a capacitor Csen connected together in series. The current flow information in the inductor 18 can be reconstructed as a voltage across the resistor-capacitor network. This method uses the intrinsic resistance of the inductor's winding as the current sensing element. As would be appreciated by the skilled artisan, the intrinsic resistance of the inductor's winding has a temperature coefficient. The current sensor 30 is connected to the illustrated feedback signal processing loop circuit 32 cooperating with the pulse width modulation circuit 16 for controlling the power switches 12, 14 responsive to the current sensor. The resistor Rsen and capacitor Csen may have respective values so that the current sensor 30 is a substantially instantaneous current sensor.

Importantly, the current sensor 30 is a thermally compensated current sensor having a temperature coefficient that substantially matches a temperature coefficient of the output inductor 18. The load line accuracy can be improved by compensating for the intrinsic current sensing temperature characteristic. In other words, the current loop gain is modified as a function of temperature to cancel the temperature characteristic of the intrinsic current sensing element, e.g. the output inductor 18. Accordingly, the disadvantages of the prior art inductor current sensing techniques are overcome.

The feedback signal processing circuit 32 may include a voltage regulation loop circuit cooperating with a peak current control loop circuit for setting a peak current level. The current sense signal is processed through the schematically illustrated feedback signal processing loop circuit 32 to properly condition the signal for pulse width modulation circuit 16. Those of skill in the art will readily appreciate the construction of the many possible and equivalent variations of the feedback signal processing loop circuit 32, such as disclosed, for example, in the above cited U.S. Pat. Nos. 5,717,322 and 5,793,193.

The DC-to-DC converter may also include an overload detection circuit which uses the sensed current signal from the current sensor 30 to prevent overloads as will be readily understood by those skilled in the art. The DC-to-DC converter 10 may also include additional features/circuit portions not shown for clarity including, for example, soft start and slope compensation circuit portions. The DC-to-DC converter 10 may also include a hysteretic comparator, not shown, for switching between a normal operating mode and a discontinuous low current demand mode.

Figure 2:
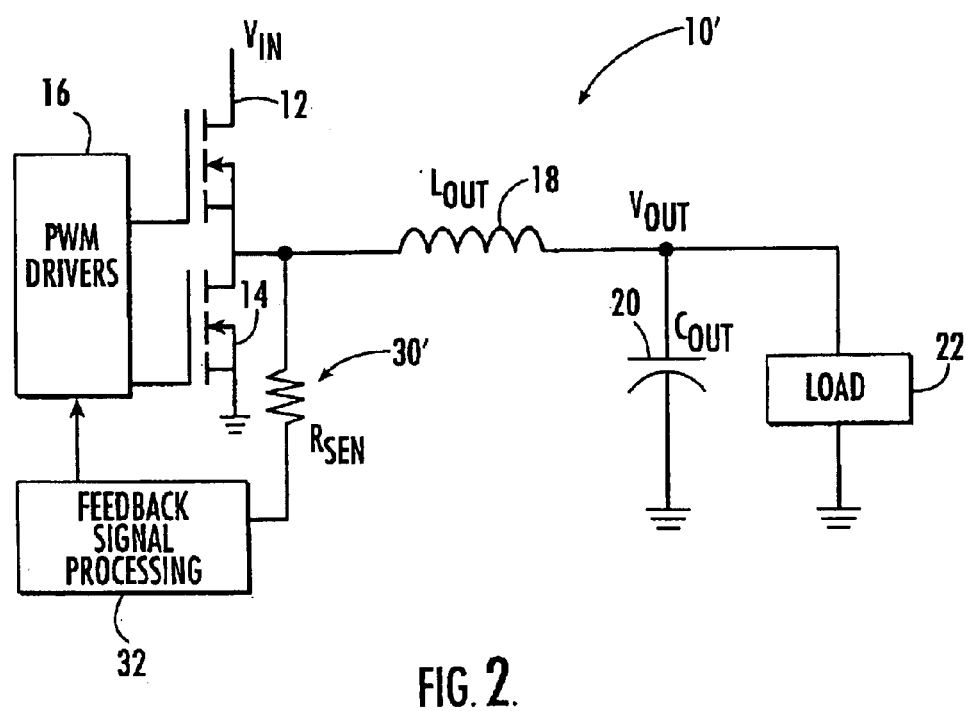
FIG. 2 is a schematic diagram of a second embodiment of a DC-to-DC converter of the present invention.

Another embodiment of the invention will now be described while referring to FIGS. 2–4. Here, the DC-to-DC converter 10' includes a thermally compensated current sensor 30' connected to the power switches 12, 14 for providing a sensed current proportional to a current being conducted through the output inductor 18. Here, the thermally compensated current sensor 30' has a temperature coefficient that substantially matches a temperature coefficient of an on-state resistance of one of the power switches 12, 14, e.g. the low side power switch 14. Also, in this embodiment, the thermally compensated current sensor 30' is connected between the power switches 12, 14 and the current feedback circuit 32, and includes a positive temperature coefficient resistor.

As discussed above and in U.S. Pat. No. 6,246,220, the Rds(on) method samples the voltage drop during the conduction interval of the MOSFET to reconstruct the current flow information. For this example, the voltage is sampled across the lower MOSFET 14 (shown in FIG. 2) using the resistor Rsen connected to feedback signal processing 32 including virtual-ground. The sensed current (Isen) is proportional to the inductor current (Il) by the following relationship: Isen=Il×(Rds/Rsen). As the MOSFET temperature increases, its Rds(on) increases which causes a corresponding increase in the sensed current Isen. The Isen signal is further processed within the system to provide a load line characteristic that is also a function of MOSFET temperature.

The Isen signal can be thermally compensated by selecting a Rsen resistor with the appropriate thermal characteristics. For example, selecting a positive temperature coefficient (PTC) resistor that matches the MOSFETs Rds(on) temperature coefficient minimizes the Isen, and droop voltage, dependency on MOSFET temperature.

Figure 3:
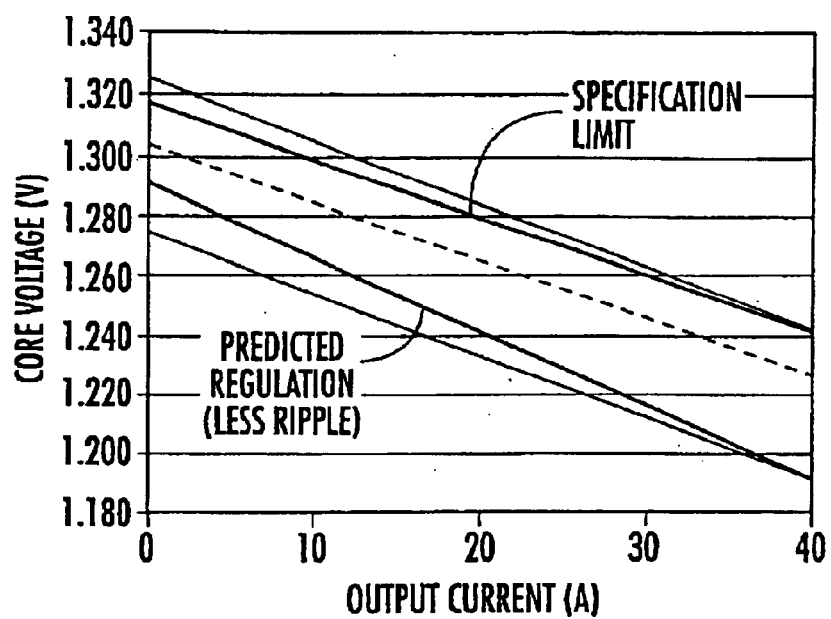
FIG. 3 is a graph illustrating the load line characteristics of a conventional DC-to-DC converter without thermal compensation.

FIG. 3 shows a typical load line specification and the RSS tolerance analysis of a conventional DC-to-DC converter utilizing power switch's, e.g. a MOSFET's, on-state resistance (Rds(on)) as the current sensing element. The analysis includes the variations due to the reference, voltage setting resistors, and MOSFET parameters. The largest variation is due to the temperature characteristic of the MOSFET.

Figure 4:
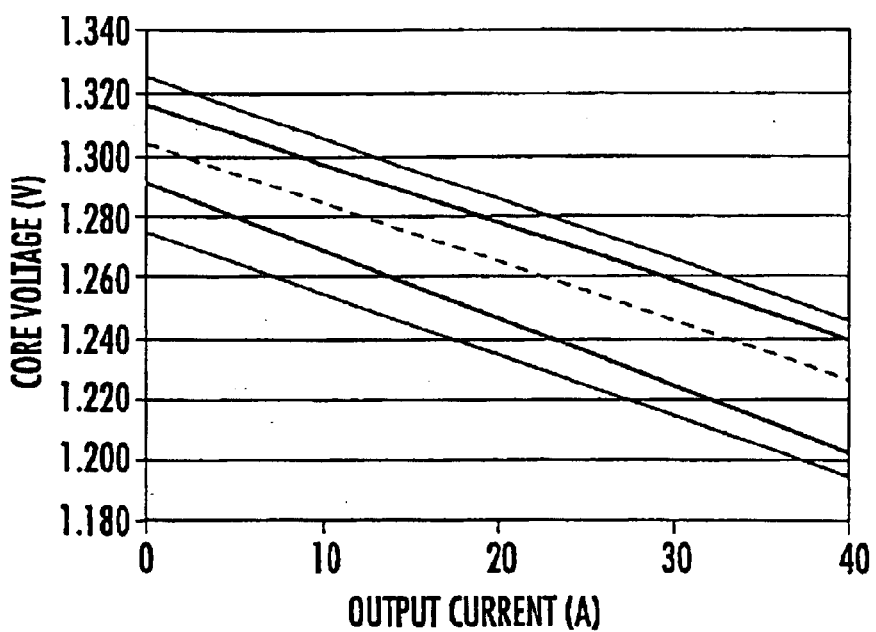
FIG. 4 is a graph illustrating the load line characteristics of the DC-to-DC converter of FIG. 2.

FIG. 4 illustrates the RSS tolerance analysis of a DC-to-DC converter with thermal compensation in accordance with the present invention. The minimum and maximum load lines fall within the specification.

Figure 5:
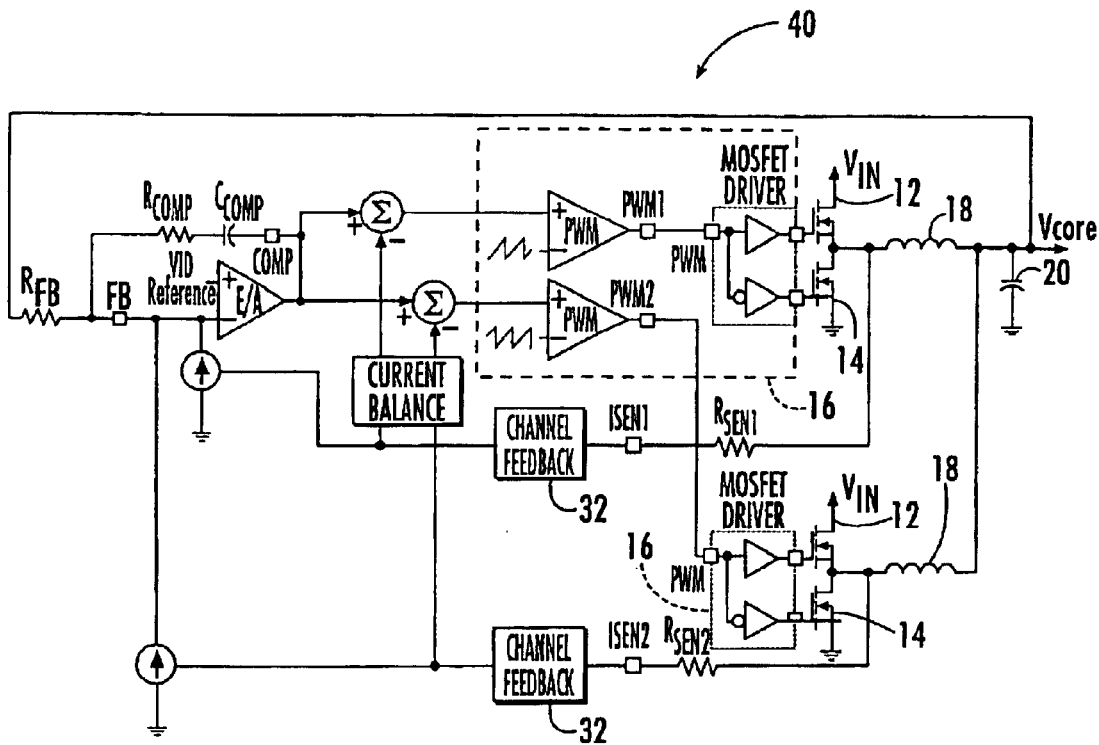
FIG. 5 is a schematic diagram of a multiphase DC-to-DC converter in accordance with the present invention.
Figure 6:
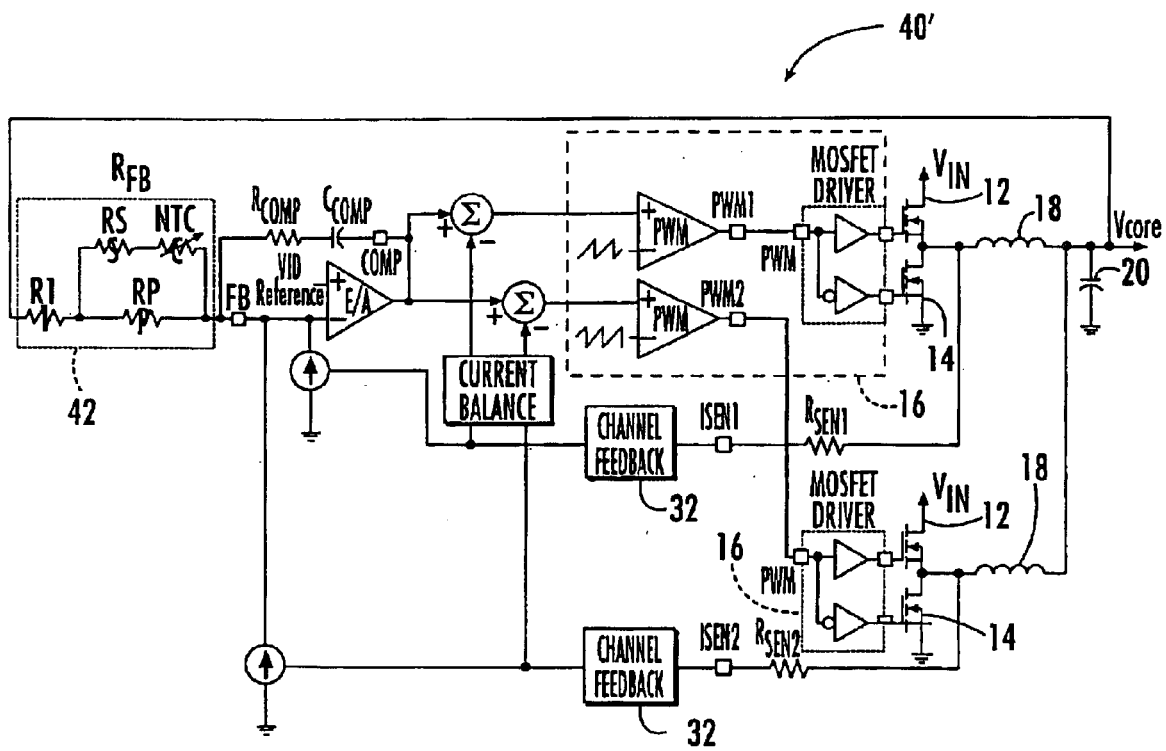
FIG. 6 is a schematic diagram of an alternative embodiment of the multiphase DC-to-DC converter of FIG. 5.

Another aspect of the present invention relates to a multiphase DC-to-DC converter 40 having first and second channels, and which will be described with reference to FIGS. 5 and 6. Each of the channels includes a power device with, e.g. a low side power switch 14 and a high side power switch 12 connected together. A pulse width modulation circuit 16 generates control pulses for the power device, and an output inductor 18 is connected between the power device and the output terminal. For multiphase power converters a PTC resistor is required on each power channel. Thus, a thermally compensated current sensor Rsen1, Rsen2 is connected to the power device in each channel for providing a sensed current proportional to a current being conducted through the respective output inductor. The thermally compensated current sensor Rsen1, Rsen2 has a temperature coefficient that substantially matches a temperature coefficient of an on-state resistance of the low side power switch 14.

In an alternative embodiment, the multiphase DC-to-DC converter 40' (FIG. 6), includes a feedback resistive network connected between an input of the pulse width modulation circuit or control circuit of each of channels and the output terminal. The feedback resistive network Rfb includes a negative temperature coefficient resistor Rntc having a temperature coefficient that substantially matches a temperature coefficient of an on-state resistance of the low side power switch 14 of the power devices.

This approach compensates for the thermal effects of current sensing utilizing a negative temperature coefficient resistor Rntc. The embodiment uses a single NTC device for temperature correction in multiphase converters as compared with the PTC compensation method. The resistor Rfb in the embodiment of FIG. 5 is replaced with an NTC resistor network to provide correction of the Isen signal. NTC resistors typically have non-linear thermal characteristics. The resistance can be linearized over the temperatures of interest using a network of standard resistors 42 connected as shown in FIG. 6.

Another aspect of the invention relates to a method for regulating a DC-to-DC converter 10, 10' of the type as described above and comprising power switches 12, 14, a pulse width modulation circuit 16 for generating control pulses for the power switches, an output inductor 18, and a feedback signal processing circuit 32 cooperating with the pulse width modulation circuit. The method preferably includes sensing current passing through the inductor 18 using a thermally compensated current sensor 30 connected in parallel with the output inductor. Again, the thermally compensated current sensor has a temperature coefficient that substantially matches a temperature coefficient of the output inductor. Furthermore, the current feedback loop circuit 32 operates to control the power switches 12, 14 in response to the thermally compensated current sensor. The current sensor 30 preferably comprises a resistor Rsen and a capacitor Csen connected together in series.

Alternatively, the method may include providing a sensed current proportional to a current being conducted through the output inductor 18 using a thermally compensated current sensor 30' (FIG. 2) connected to the power switches. Here, the thermally compensated current sensor 30' has a temperature coefficient that substantially matches a temperature coefficient of an on-state resistance of one power switch. The current feedback loop circuit 32 controls the at least one power switch in response to the thermally compensated current sensor 30'.

It is understood by those skilled in the art that all the above described embodiments can be applied to the inductor wire current sensing approach or the Rds(on) current sensing approach.

Many modifications and other embodiments of the invention will come to the mind of one skilled in the art having That which is claimed is:

1. A DC-to-DC converter comprising:
   at least one power switch;
   a pulse width modulation circuit for generating control pulses for the at least one power switch;
   an output inductor connected to the at least one power switch;
   a thermally compensated current sensor connected in parallel to the output inductor and comprising a resistor and capacitor connected in series for sensing current in the output inductor, the thermally compensated current sensor having a temperature coefficient that substantially matches a temperature coefficient of the output inductor; and
   a current feedback loop circuit cooperating with the pulse width modulation circuit for controlling the at least one power switch responsive to the thermally compensated current sensor.

2. A DC-to-DC converter according to claim 1 wherein the at least one power switch comprises at least one field effect transistor.

3. A DC-to-DC converter according to claim 1 wherein the at least one power switch comprises a low side field effect transistor and a high side field effect transistor connected together.

4. A DC-to-DC converter according to claim 1 wherein the at least one power switch comprises a low side power switch and a high side power switch connected together.

5. A DC-to-DC converter according to claim 1 wherein the resistor of the thermally compensated current sensor comprises a positive temperature coefficient resistor.

6. A DC-to-DC converter comprising:
   at least one power switch;
   a pulse width modulation circuit for generating control pulses for the at least one power switch;
   an output inductor connected to the at least one power switch;
   a thermally compensated current sensor connected to the at least one power switch for providing a sensed current related to a current being conducted through the output inductor, the thermally compensated current sensor having a temperature coefficient that substantially matches a temperature coefficient of an on-state resistance of the at least one power switch;
   a current feedback loop circuit cooperating with the pulse width modulation circuit for controlling the at least one power switch responsive to the thermally compensated current sensor.

7. A DC-to-DC converter according to claim 6 wherein the at least one power switch comprises at least one field effect transistor.

8. A DC-to-DC converter according to claim 6 wherein the at least one power switch comprises a low side field effect transistor and a high side field effect transistor connected together.

9. A DC-to-DC converter according to claim 6 wherein the at least one power switch comprises a low side power switch and a high side power switch connected together.

10. A DC-to-DC converter according to claim 6 wherein the thermally compensated current sensor is connected between the at least one power switch and the current feedback loop circuit, and the thermally compensated current sensor comprises a resistor.

11. A DC-to-DC converter according to claim 10 wherein the resistor of the thermally compensated current sensor comprises a positive temperature coefficient resistor.

12. A multiphase DC-to-DC converter comprising:
    at least first and second channels each comprising
    a power device including a low side power switch and a high side power switch connected together,
    a pulse width modulation circuit for generating control pulses for the power device;
    an output inductor connected to the power device,
    a thermally compensated current sensor connected to the power device for providing a sensed current related to a current being conducted through the output inductor, the thermally compensated current sensor having a temperature coefficient that substantially matches a temperature coefficient of an on-state resistance of the low side power switch,
    a current feedback loop circuit cooperating with the pulse width modulation circuit for controlling the power device responsive to the thermally compensated current sensor.

13. A multiphase DC-to-DC converter according to claim 12 wherein each of the power switches comprises a field effect transistor.

14. A multiphase DC-to-DC converter according to claim 12 wherein the thermally compensated current sensor is connected between the power device and the current feedback loop circuit, and the thermally compensated current sensor comprises a resistor.

15. A multiphase DC-to-DC converter according to claim 14 wherein the resistor of the thermally compensated current sensor comprises a positive temperature coefficient resistor.

16. A multiphase DC-to-DC converter comprising:
    at least first and second channels each comprising
    a power device including a low side power switch and a high side power switch connected together,
    a pulse width modulation circuit for generating control pulses for the power device;
    an output inductor connected to the power device,
    a current sensor connected to the power device for providing a sensed current proportional to a current being conducted through the output inductor,
    a current feedback loop circuit cooperating with the pulse width modulation circuit for controlling the power device responsive to the current sensor; and
    a feedback resistive network connected between an input of the pulse width modulation circuit of each of the at least first and second channels and the output terminal, and comprising a negative temperature coefficient resistor having a temperature coefficient that substantially matches a temperature coefficient of an on-state resistance of the low side power switch of the power device of the at least first and second channels.

17. A multiphase DC-to-DC converter according to claim 16 wherein each of the power switches comprises a field effect transistor.

* * * * *